G. W. WARD.
COTTON PICKER.
APPLICATION FILED NOV. 17, 1915.
1,219,204.
Patented Mar. 13, 1917.
3 SHEETS—SHEET 1.
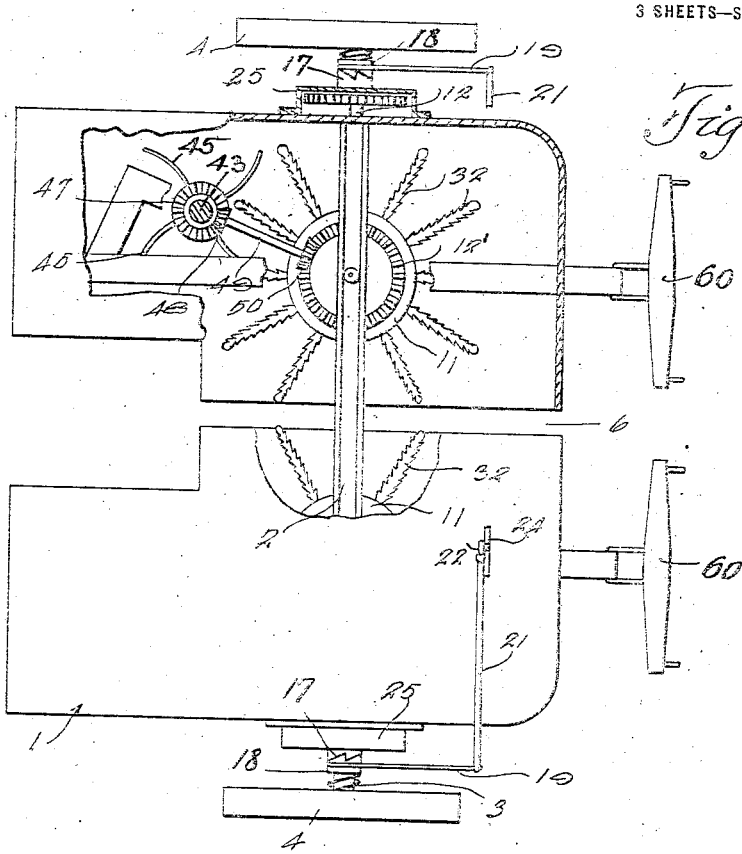
Fig. 1
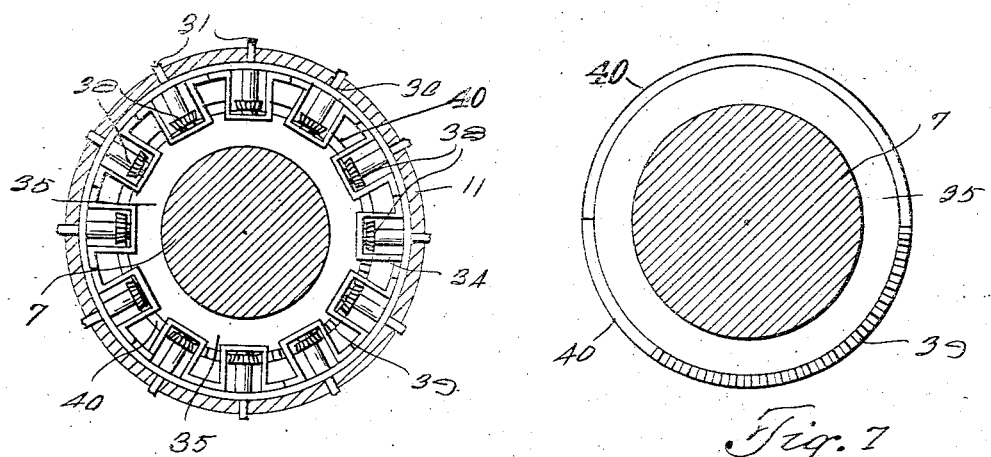
Fig. 6
Fig. 7
Witnesses
Chas. H. Trotter
Rob't Meyer
Inventor
G. W. Ward
Attorney G. W. WARD.
COTTON PICKER.
APPLICATION FILED NOV. 17, 1915.
1,219,204.
Patented Mar. 13, 1917.
3 SHEETS—SHEET 2.
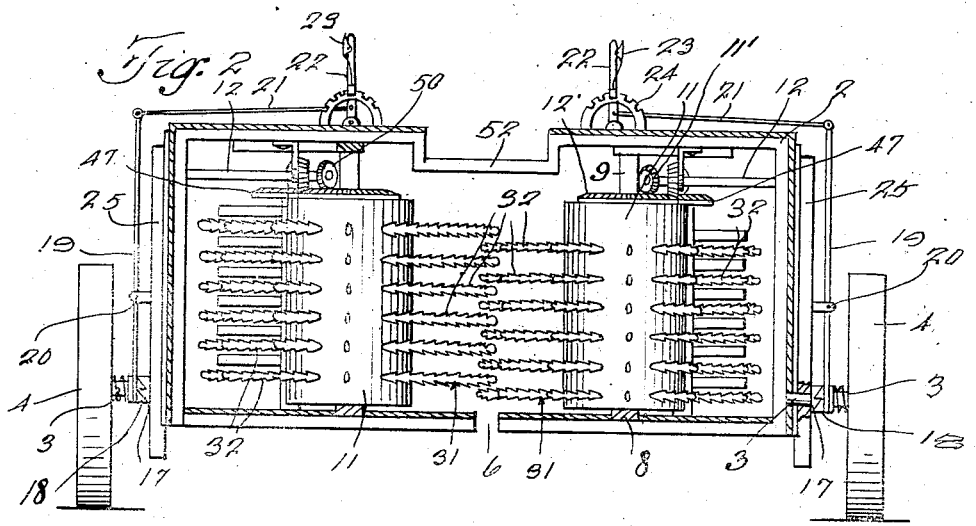
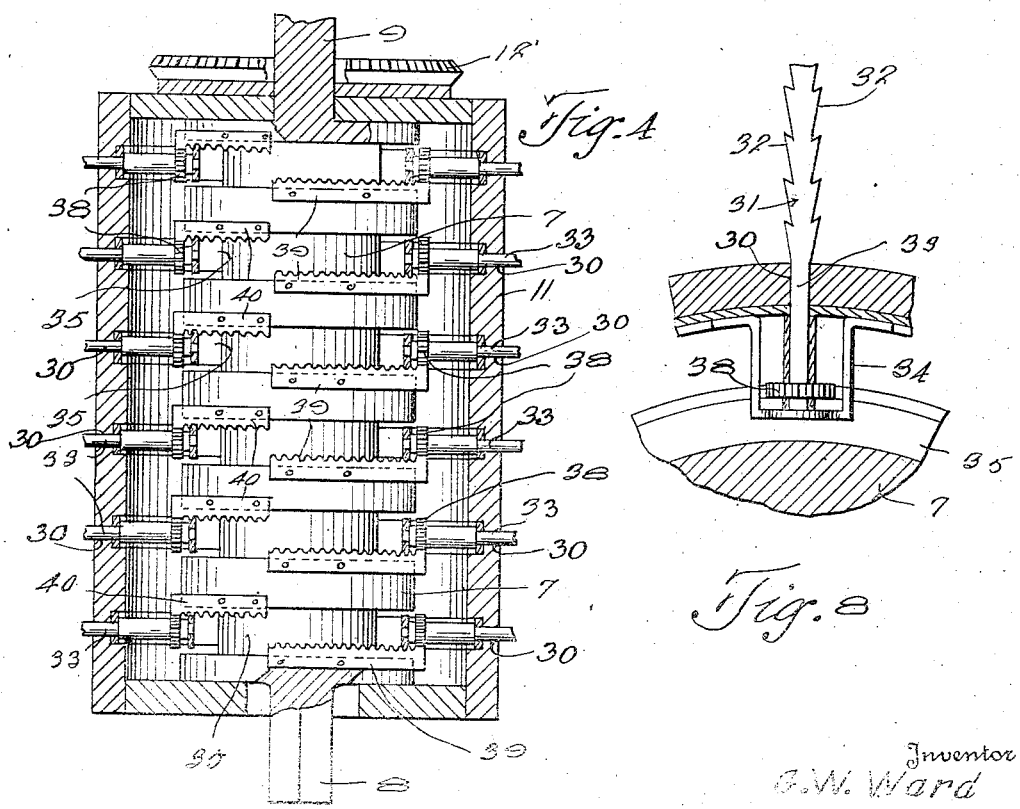

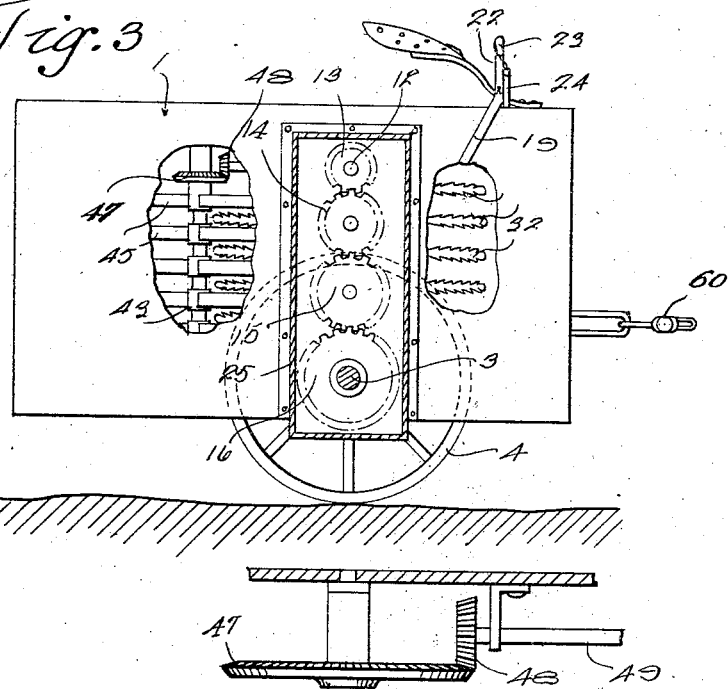
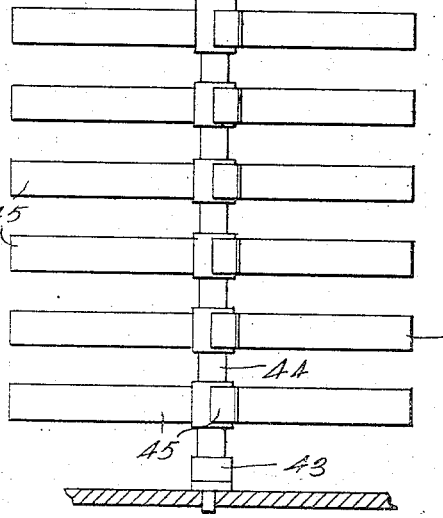
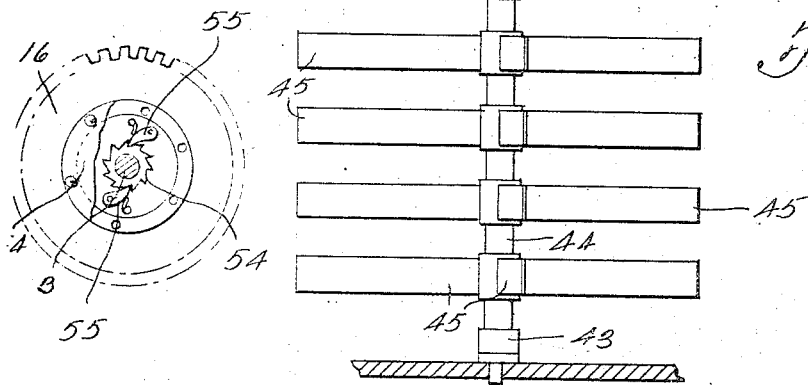

UNITED STATES PATENT OFFICE.

GEORGE W. WARD, OF LONE MOUNTAIN, TENNESSEE.

COTTON-PICKER.

1,219,204. Specification of Letters Patent. Patented Mar. 13, 1917.

Application filed November 17, 1915. Serial No. 62,018.

*To all whom it may concern:*

Be it known that I, GEORGE W. WARD, a citizen of the United States, residing at Lone Mountain, in the county of Claiborne and State of Tennessee, have invented certain new and useful Improvements in Cotton-Pickers; and I do hereby declare the following to be a full, clear, and exact description of the invention, such as will enable others skilled in the art to which it appertains to make and use the same.

This invention relates to cotton pickers, and the primary object of the invention is to provide a cotton picker which includes a pair of spaced vertically positioned members adapted for positioning upon each side of a row of cotton for engaging the cotton plants and picking the cotton from the bolls of the plants.

Another object of this invention is to provide in a cotton picker structure as specified, a stationary cylinder and a rotatable cylinder positioned about the stationary cylinder, and to provide a plurality of rotatable picking spindles which are carried by the rotatable cylinder for moving into and out of a cotton engaging position, and further to mount segmental racks upon the stationary cylinder for engagement with gears carried by the ends of said picking spindles for rotating the picking spindles in a cotton picking direction during the period of time in which the spindles are in a cotton engaging position, and for rotating the spindles in a reverse direction after they have passed out of a cotton picking position.

Another object of this invention is to provide a novel form of stripping mechanism for stripping the cotton from the picking spindles and depositing it in suitable retaining receptacles.

With the foregoing and other object in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a plan view of the improved cotton picker showing parts thereof broken away, Fig. 2 is a vertical section of the improved cotton picker showing parts in section, Fig. 3 is a side elevation of the improved cotton picker showing parts broken away, Fig. 4 is a sectional view through the rotatable cylinder showing the stationary cylinder in side elevation, Fig. 5 is a side elevation of the stripping mechanism.

Fig. 6 is a cross section through one of the picking cylinder structures, the picking spindles being broken away, Fig. 7 is a cross section through one of the picking cylinder structures having the outer cylinders removed, Fig. 8 is an enlarged fragmentary sectional view through one of the picking cylinders showing a fragment of one of the picking spindles attached thereto, and Fig. 9 is a view showing a ratchet construction employed in the construction of the cotton picker.

Referring more particularly to the drawings, 1 designates the main body of the cotton picker, which is constructed of sheet metal, and is supported by suitable supporting bars. An arch axle 2 is provided, the horizontal portion of which extends entirely across the upper surface of the main body 1 and which axle is bent downwardly at the sides of the body 1 and has spindles 3 formed thereon and extending outwardly through the main body or casing as clearly shown in Fig. 2 of the drawings upon which spindles the supporting wheels 4 of the cotton picker are mounted.

The housing 1 of the cotton picker is divided into two sections, one of which travels over the left side of a row of cotton plants and the other of which travels on the right side, there being a space indicated at 6, between the facing sides of the sections, through which the stems or stalks of the cotton plants are positioned during the operation of the cotton picker. Positioned within each of the sections of the housing or body 1, is a cotton picking structure, which includes a vertically positioned stationary roll or cylinder 7. The cylinder 7, has a rectangular shaft 8 formed upon its lower end, and a vertically extending shaft 9 formed upon its upper end. The lower rectangular shaft 8 extends through the bottom of the housing 1. The hollow rotatable cylinder 11 is positioned concentrically about the stationary cylinder 7, and it has a beveled gear 12' attached to its upper end. The beveled gear 12' meshes with a beveled pinion 11', which is carried by a shaft 12. The shaft 12 projects out of the side of the casing 1 and has a gear 13 mounted thereon, which meshes with a gear 14. The gear 14 meshes with a second gear 15, which in turn meshes with a gear 16. The gear 16 is mounted upon the axle 3 and has a clutch segment indicated at 17 formed upon its hub section which is adapted for coaction with a clutch segment 18 keyed upon the axle 3. The clutch segment 18 has a rod 19 connected thereto, which rod is pivotally supported as at 20. A rod 21 is connected to the upper end of the rod 19 and to a hand lever 22. A dog mechanism 23 is carried by the hand lever 22 and coacts with a quadrant 24 for holding the lever and consequently the rod 21 and rod 19 in various adjusted positions, for holding the clutch segment 18 into or out of operative engagement with the clutch segment 17 for controlling the rotation of the cylinder 11. A casing or housing 25 is mounted about the gears 13, 14, 15 and 16.

The rotatable cylinder 11, is provided with a plurality of vertically and circumferentially spaced openings 30 through which the cotton picking spindles 31 extend. The cotton picking spindles 31 have a plurality of barbs formed upon their opposite edges, as is clearly shown at 32, in Fig. 8 of the drawings. The inner or spindle end 33 of the cotton picking spindles 31 are rotatably seated in substantially U-shaped brackets 34, which are secured to the interior of the cylinder and travel in grooves 35 formed in the stationary cylinder 11. Gears 38 are mounted upon the inner ends 33 of the spindles 31 and mesh with teeth formed upon segmental rack bars 39 and 40 affixed to the stationary cylinder 7. The rack bars 39 are positioned so that their teeth extend upwardly from the bottom edges of the grooves 35, and the rack bars 40 are positioned so that their teeth extend downwardly from the upper edge of the groove 35. The rack bars 40 commence at the termination of the rack bars 39, as is clearly shown in Figs. 4 and 7, and therefore extend only partially around the cylinder 7.

During the rotation of the cylinder 11, the various spindles 31 which extend outwardly from the cylinder 11 in spaced rows, will be moved into and out of a cotton picking position. The segmental rack bars 39 are positioned, so that when the spindles 31 move into a cotton picking position, they will be rotated, owing to the fact that the gears 38 will mesh with the teeth of the rack bars 39. When the spindles 31 move out of a cotton picking position, the gears 38 move out of engagement with the teeth of the rack bars 39 and into engagement with the teeth of the rack bars 40, which rotate the spindles in a reverse direction to the direction in which they were rotated by the rack bars 39, permitting of the untwisting or unwinding of the cotton from the spindles and facilitating the action of stripper members 45 to be described. The stripper members, one of which is mounted within each of the sections of the housing 1 include vertical shafts 43. The shafts 43 are provided with annular grooves indicated at 44 formed at spaced intervals throughout their lengths, and corresponding to the level of the picking spindles 31. Arcuate arms 45 are attached to and radiate from the shafts 43. The arms 45 engage the cotton and strip the same from the spindles 31 during their reverse rotation, and throw the cotton rearwardly within the housing 1, for deposit in an ordinary cotton receiving sack which may be attached to the rear end of the housing. The shafts 43 have beveled gears 47 mounted thereon which mesh with beveled pinions 48. The pinions 48 are mounted upon shafts 49. The shafts 49 extend forwardly from the stripping members and have beveled pinions 50 mounted on their ends remote from the beveled pinions 48. The beveled gears 50 mesh with the beveled gear 12.

The arch axle 2 is bent downwardly as is shown at 52, so that it will engage the top of the cotton plants and bend them downwardly in a position to be engaged by the uppermost of the cotton picking spindles.

In Fig. 9 of the drawings, a ratchet construction is shown, which is mounted upon the gear 16, and is provided for permitting backward movement of the cotton harvester without operating the cotton picking mechanism. The axle 3, has a ratchet 54 mounted thereupon, with which spring controlled pawls 55 coact, for insuring the rotation of the gear with the rotation of the axle during the forward movement of the cotton harvester. When the cotton harvester is backed, the pawls will slip over the ratchet and permit the gear to run free upon the axle which is the ordinary construction employed in various types of agricultural implements. A housing indicated at 54 is positioned over the ratchet to prevent the accumulation of dirt or the like thereon.

In the operation of the improved cotton harvester, the cotton harvester is pulled along a row of cotton, so that the stalks of the cotton plants will pass through the space 6, between the facing sides of the sections of the housing 1. The clutch mechanisms 17 and 18, which are duplicated upon each side of the cotton harvester, are thrown into operation, which will rotate each of the rotatable cylinders 11 which cylinders are geared for rotation toward each other. During the rotation of the cylinders 11, the cotton picking spindles 31 will be rotated, when they are in position for engaging the cotton plants, by the meshing engagement between the gears 38 and the rack bars 39. The rotation of the spindles will cause the barbs 32 to engage the cotton and pull it from the bolls. When the gears 38 have moved out of engagement with the rack bars 39, at which time the spindles will be out of a cotton picking position, the gears will move into engagement with the rack bars 40, which will reverse the direction of rotation of the spindles and untwist the cotton therefrom. The cotton will then be free so that the arms 45 of the stripper structure may engage the cotton and strip it from the spindles. The rotation of the stripper structure will throw the cotton rearwardly for deposit into an ordinary cotton bag or suitable receptacle which may be attached to the rear end of the housing 1 of the cotton picker. Swingletrees 60 are attached to the draft tongues.

From the foregoing description taken in connection with the accompanying drawings the advantages of construction and of the method of operation of the improved cotton picker will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

In a cotton picker structure, a supporting frame, a stationary cylinder carried by said frame, a rotary cylinder positioned about said stationary cylinder, means for rotating said rotary cylinder, said stationary cylinder provided with a plurality of vertically spaced circumferential channels, bearing brackets carried by said rotary cylinder and extending into said channels, sleeves rotatably supported by said brackets, picking spindles removably carried by said sleeves and extending out of said rotary cylinder, gears mounted upon said sleeves, rack bars carried by said stationary cylinder for meshing engagement with said gears for rotating said spindles during rotation of said rotary cylinder, said rack bars being arranged for rotating said spindles in one direction during one-half of a revolution of said rotary cylinder and for rotating the spindles in the opposite direction during the remaining half of a revolution of the rotary cylinder, a stripper structure rotatably carried by said supporting frame and having a plurality of arcuate radiating arms for passage between the horizontal rows of said spindles for stripping the cotton therefrom.

In testimony whereof I affix my signature in presence of two witnesses.

GEORGE W. WARD.

Witnesses:
  J. T. WARD,
  NOAH WARD.